United States Patent

Ramos et al.

Patent Number: 5,930,857
Date of Patent: Aug. 3, 1999

[54] APPARATUS FOR CLEANING A SURFACE OF A MOVING WEB

[75] Inventors: Fernando Ramos; Larry T. Shafer, both of Rochester; Sharon A. Guzman, Kent, all of N.Y.

[73] Assignee: Eastman Kodak Company, Rochester, N.Y.

[21] Appl. No.: 09/018,766

[22] Filed: Feb. 5, 1998

Related U.S. Application Data

[60] Provisional application No. 60/061,957, Oct. 14, 1997.

[51] Int. Cl.$^6$ ...................................................... B08B 1/04
[52] U.S. Cl. .................................. 15/3; 15/100; 15/256.51
[58] Field of Search ............................... 15/3, 100, 256.51

[56] References Cited

U.S. PATENT DOCUMENTS

| | | | |
|---|---|---|---|
| 4,009,047 | 2/1977 | Lindsay | 134/9 |
| 4,557,588 | 12/1985 | Tomosada | 399/352 |
| 4,704,803 | 11/1987 | Valentini | 34/336 |
| 4,982,469 | 1/1991 | Nishiwaki | 15/3 |
| 5,198,243 | 3/1993 | Shimizu et al. | 425/230 |
| 5,251,348 | 10/1993 | Corrado et al. | 15/256.53 |
| 5,275,104 | 1/1994 | Corrado et al. | 101/425 |
| 5,337,767 | 8/1994 | Ernst et al. | 134/104.1 |
| 5,349,714 | 9/1994 | Korbonski et al. | 15/3 |
| 5,425,813 | 6/1995 | Ernst et al. | 134/9 |
| 5,699,584 | 12/1997 | Wieloch et al. | 15/3 |
| 5,855,037 | 1/1999 | Wieloch et al. | 15/3 |

*Primary Examiner*—Mark Spisich
*Assistant Examiner*—Theresa T. Snider
*Attorney, Agent, or Firm*—Susan L. Parulski

[57] ABSTRACT

Apparatus for cleaning a surface of a moving web of material, particularly photosensitive web material. A particle transfer roller is disposed adjacent the moving web, and driven to a pre-determined speed approaching but not greater than a sensed speed of the moving web. A passive one-way clutch coupled to the particle transfer roller is engaged, such that when the driven particle transfer roller contacts the moving web, the moving web drives the particle transfer roller. A cleaning station is disposed adjacent the particle transfer roller so as to provide renewal of the particle transfer roller.

9 Claims, 4 Drawing Sheets

APPARATUS FOR CLEANING A SURFACE OF A MOVING WEB

CROSSREFERENCE TO RELATED APPLICATION

Reference is made to and priority claimed from U.S. Provisional Application Ser. No. 60/061,957, filed Oct. 14, 1997, entitled APPARATUS AND METHOD FOR CLEANING A SURFACE OF A MOVING WEB.

FIELD OF THE INVENTION

The invention relates to an apparatus and method for cleaning a surface of a moving web. More particularly, the invention relates to an apparatus and method for cleaning a surface of a moving web of photosensitive material using a particle transfer roller.

BACKGROUND OF THE INVENTION

During the manufacturing, printing, processing, or use of a moving web, dirt or other particles may be generated. If such particles adhere to the web, the particles may cause defects in the web resulting in the web being unsuitable for its intended use. For example, with photosensitive web material, dirt on the web may scratch the web's photosensitive layers during manufacture, or the dirt could be exposed during processing to form a visual defect in the printed photographic product.

Therefore, it is desirable to clean the web surface to remove particles from the web thereby reducing or eliminating potential defects in the web. During manufacturing, the cleaning of the web surface is preferably conducted such that the impact on the manufacturing process is minimized, the web is not adversely affected, and no quality defects are introduced to the web.

Systems for removing particles from a web surface are known. For example, air knives and suction cleaning systems. Particle transfer rollers have been suitable to remove particles. Such a particle transfer roller (PTR) typically has an adhesive or tacky surface to which particles from the web surface adhere upon contact with the PTR. As the particles accumulate on the PTR, the PTR becomes contaminated and must be cleaned periodically to restore/renew its effectiveness.

U.S. Pat. Nos. 5,425,813 and 5,337,767, commonly assigned, relate to an apparatus and method of cleaning a moving web, and more particularly, for renewing (i.e., cleaning) a PTR. One PTR is brought into contact with the moving web while another PTR is being cleaned with a renewal roller through wiping contact. The PTRs are not moving as they contact the web. Therefore, if such PTRs were applied to a moving web, scratches or abrasions may occur, particularly for webs moving at a high speed. Further, if a build-up occurs in the absorbent cleaning member, the PTR renewal effectiveness may be decreased.

U.S. Pat. No. 5,275,104 relates to an automatic roll cleaner which provides cleaning through slippage between the cleaning material and the roller. While such an apparatus may be suitable for a particular application, slippage would cause scratches and abrasions in a photosensitive material.

U.S. Pat. No. 5,251,348 relates to a roll cleaning system. A drive motor drives an out-of-service roll while it is being cleaned. A turret is then indexed to bring the cleaned roller in contact with a moving web. The roll is tacky and adhesive, and if the speeds did not match, the roll would grab, disrupt, and even damage the moving web.

U.S. Pat. No. 5,198,243 relates to a roll cleaning apparatus having a cleaning tape for wiping the surface of a roll. While such an apparatus may be suitable for its particular application, such an apparatus would scratch photosensitive web material.

U.S. Pat. No. 4,982,469 and U.S. Pat. No. 4,009,047 relate to apparatus for cleaning a surface of a sheet. While such apparatus may be suitable for their respective application, not controlling the speed of the sheet and the cleaning roller(s) may cause scratches or abrasions in the sheet, particularly photosensitive material.

Accordingly, a need continues to exist for an apparatus and method for removing contaminants from a moving web. Such an apparatus and method should not introduce defects (e.g., abrasions or scratches) to the moving web. The apparatus and method should provide for renewing the cleaning capability of the contaminant-removing apparatus without disrupting the moving web (e.g., stopping the moving web). Such an apparatus and method should be suitable for webs moving at a high rate of speed and webs which are photosensitive.

SUMMARY OF THE INVENTION

An object of the invention is to provide an apparatus and method for removing contaminants from a moving web.

Another object of the invention is to provide such an apparatus and method which does not introduce defects in the moving web.

A further object of the invention is to provide such an apparatus and method which can be utilized on a moving web without disruption to the moving web.

Yet another object of the invention is to provide such an apparatus and method which is suitable for photosensitive web material.

A still further object of the invention is to provide an apparatus and method for cleaning the contaminate-removing apparatus to renew its effectiveness, without disruption to the moving web.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an apparatus for cleaning a moving web. The apparatus includes a web speed sensor sensing the speed of the moving web. A particle transfer roller is rotatable about an axis and movable from a first position wherein the particle transfer roller cleans the moving web through contact with the moving web to a second position wherein the particle transfer roller is spaced from the moving web. A driver drives the particle transfer roller to a pre-determined speed approaching but not equal to or greater than the sensed speed of the moving web when the particle transfer roller is in the second position. An actuator then moves the driven particle transfer roller into contact with the moving web. A mechanism associated with the particle transfer roller, such as a one-way clutch, allows the particle transfer roller to be driven by the moving web at a speed greater than the pre-determined speed when the particle transfer roller is in the first position.

According to another aspect of the invention, there is provided a method for cleaning a moving web. The speed of the moving web is sensed. A particle transfer roller, spaced from the moving web, is driven to a pre-determined speed approaching but not equal to or greater than the sensed speed of the moving web. A passive one-way clutch associated with the particle transfer roller is engaged when the particle transfer roller is spaced from the moving web. The particle transfer roller is then driven into contact with the moving web, engaging the moving web with the particle transfer roller and causing the particle transfer roller to rotate at a speed greater than the pre-determined speed. As such, the particle transfer roller rotates at the speed of the moving web by means of contact with the moving web while the engagement of the one-way clutch is maintained when the particle transfer roller is contacting the moving web. The contact of the particle transfer roller and the moving web causes the web to be cleaned.

The present invention provides an apparatus and method for removing contaminants from a moving web without introducing defects to the moving web. The apparatus and method further provides for the renewal of the cleaning capability of the contaminant-removing apparatus without disrupting the moving web. It is suitable for webs moving at a high rate of speed and webs which are photosensitive.

BRIEF DESCRIPTION OF THE DRAWING

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1A:
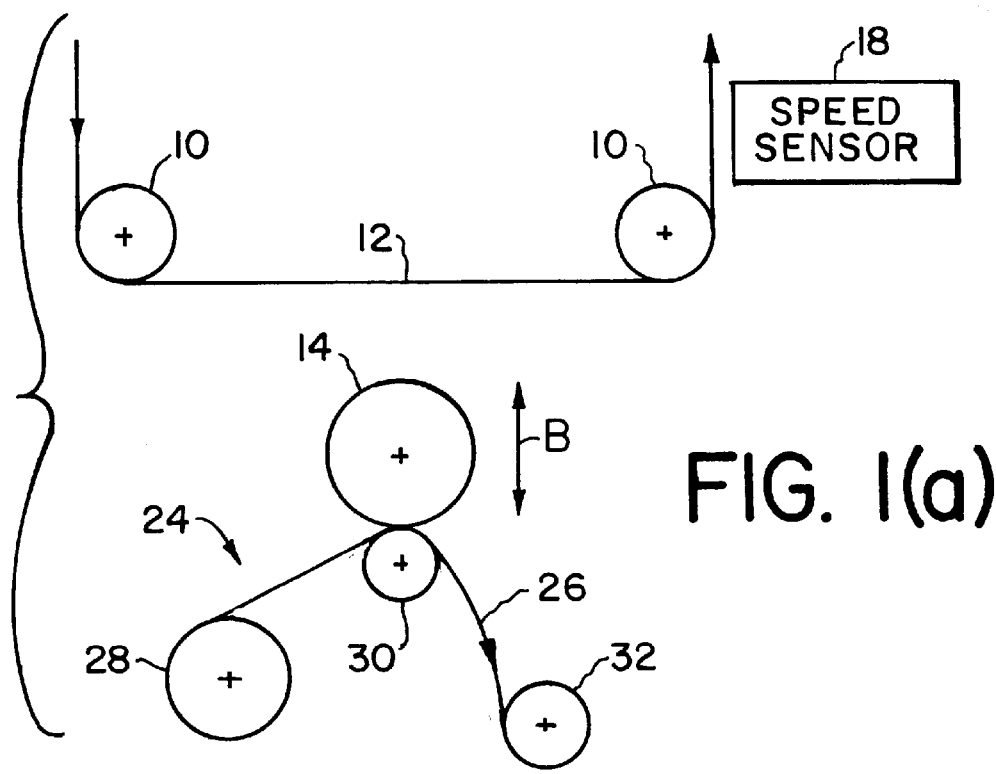
FIGS. 1(a) and 1(b) show a first and second position of a web cleaning apparatus in accordance with the present invention.
Figure 1B:
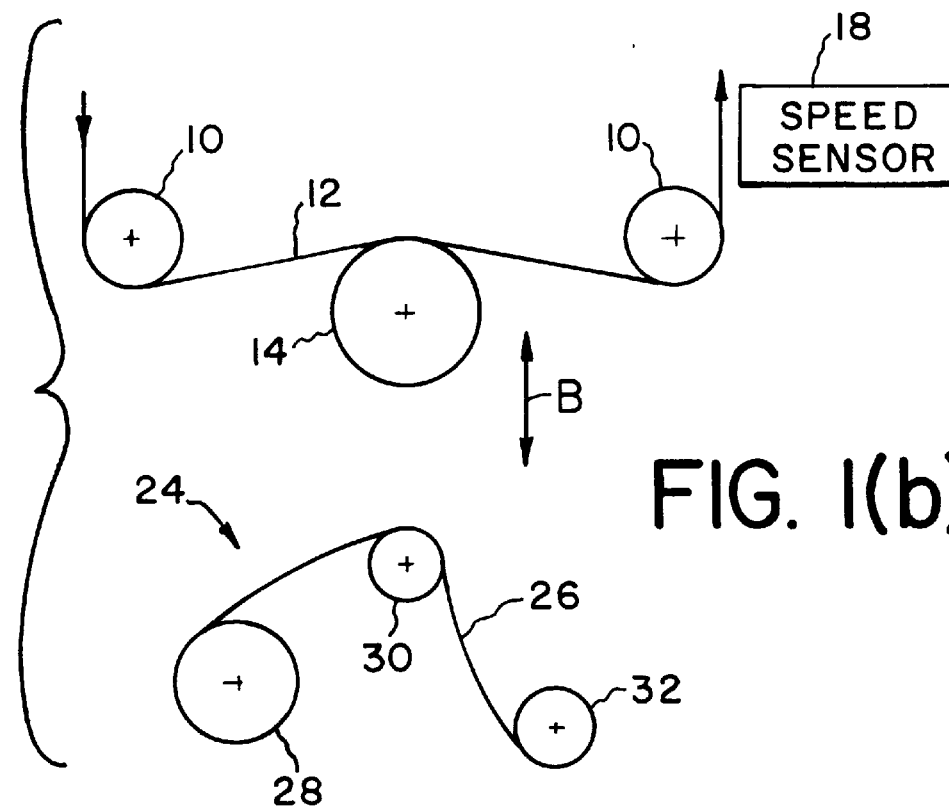
Figure 2:
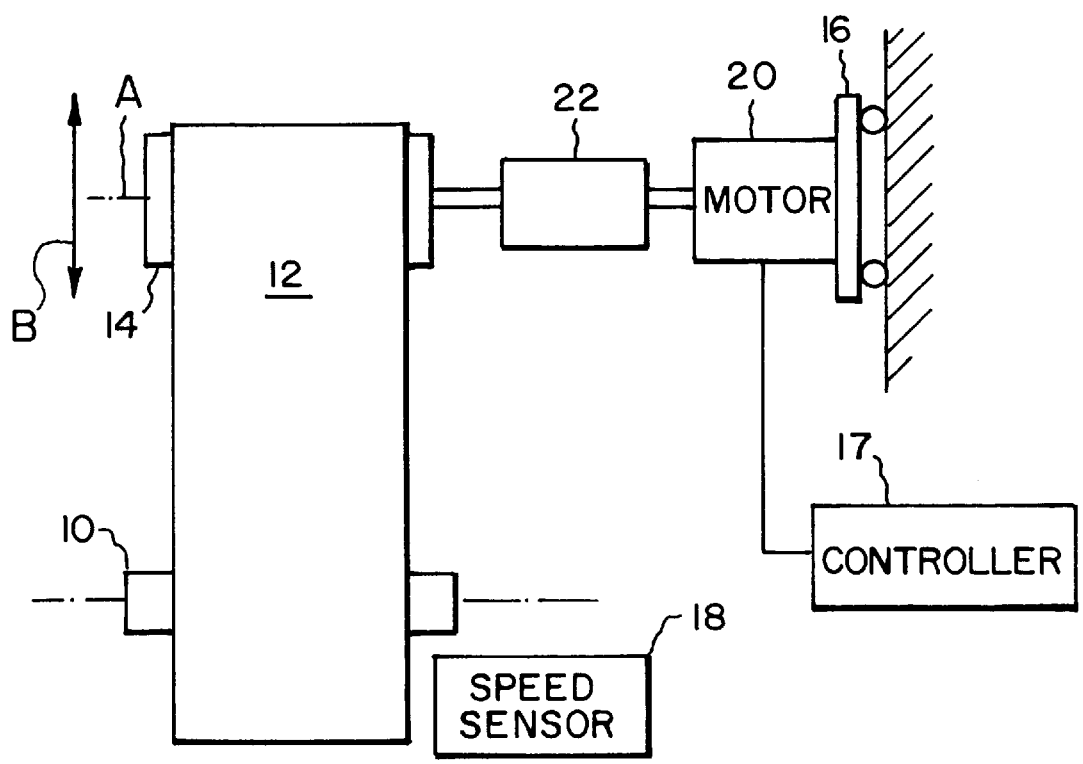
FIG. 2 shows a web cleaning apparatus in accordance with the present invention.

The following is a detailed description of the preferred embodiments of the invention, reference being made to the drawings in which the same reference numerals identify the same elements of structure in each of the several figures. One Particle Transfer Roller and Cleaning Station FIGS. 1(a), 1(b), and 2 illustrate a web cleaning apparatus in accordance with the present invention. A plurality of transport rollers 10 are rotatably mounted for transporting web 12. A rotatably mounted particle transfer roller (PTR) 14 disposed along the path of the web. The PTR is generally located downstream in a web transport apparatus so as to collect a maximum of the particulate matter. While PTR 14 rotates about an axis A, PTR 14 is mounted so as to be movable in direction B perpendicular to its rotational axis A.

An actuator 16 is provided to move PTR 14 from a first position to a second position along direction B. Such actuators 16 for providing such a motion are known to those skilled in the art. In a first position illustrated in FIG. 1(a), PTR 14 is spaced from web 12. In a second position illustrated in FIG. 1(b), PTR 14 contacts web 12 for cleaning the web. A controller 17 may be employed to control the actuation of actuator 16.

A speed sensor 18 is disposed adjacent web 12 to determine the speed S (not illustrated) of web 12. Such a speed sensor 18 is known to those skilled in the art. For example, speed sensor 18 can be a roller disposed in the web path mechanically coupled with an encoder or tachometer. Another example is an optical device.

A driver 20, such as a motor, is provided to drive PTR 14 to a pre-determined speed V. An interface or mechanism 22 is mechanically coupled with driver 20 and PTR 14. Preferably mechanism 22 is a one-way passive clutch 22 disposed between PTR 14 and driver 20. The clutch can be mounted within the PTR to minimize the inertia of rotating components. One-way passive clutches are commercially available.

With PTR 14 spaced from web 12, PTR 14 is driven to a pre-determined speed V (not illustrated) which approaches the web speed S sensed by speed sensor 18; pre-determined speed V is not equal to or greater than the sensed web speed S. PTR 14 is translated along axis B into engagement with web 12 by actuators 16. Mechanism 22 operates such that, as PTR 14 engages web 12, web 12 is moving at sensed speed S which is faster than pre-determined speed V, and thus PTR 14 is driven by moving web 12 at speed S. As such, PTR 14 acts as an idler roller as it contacts moving web 12. Mechanism 22 allows web 12 to drive PTR 14 up to speed S without activation or deactivation of any mechanical components. That is, the transition between the first position and the second position (i.e., engagement of PTR 14 with moving web 12) is automatic and passive. As such, a user does not need to interact electrically or mechanically with the invention.

Further illustrated in FIGS. 1(a) and 1(b) is a cleaning station 24 for cleaning PTR 14 to renew its effectiveness. Cleaning station 24 includes a cleaning web 26 transported from a supply roll 28, across a cleaning transport roller 30 and wound onto a take-up roll 32. As illustrated in FIG. 1(a), cleaning station 24 is disposed such that PTR 14 may abut cleaning web 26 and form a nip with cleaning roller 30 when PTR 14 is spaced from web 12. Cleaning web 26 includes a tacky contact surface whereby the cleaning of PTR 14 is accomplished through rolling contact of PTR 14 with cleaning web 26. Cleaning web 26 has higher adhesion properties than PTR 14, allowing particulate matter from the PTR to transfer to the cleaning web. Other methods of cleaning the PTR may be known, for example, by means of a cleaning fluid.

In operation, PTR 14 is spaced from web 12, and speed sensor 18 determines speed S of moving web 12. PTR 14 is then driven to a pre-determined speed V approaching, but not equal to or greater than, sensed speed S of moving web 12. Passive one-way clutch 22, mechanically coupled with PTR 14, is engaged. Actuator 16 is actuated to thereby move PTR 14 into contact with moving web 12. As PTR 14 engages moving web 12, PTR 14 is driven through contact with the moving web, whereby the PTR acts as an idler roller and matches the speed S of the moving web. The transition is automatic and passive; clutch 22 is not disengaged. Motor 20 can then be turned off or can remain running.

The contact of PTR 14 with moving web 12 removes the particulate matter from the web, and is adhered to PTR 14.

When the particulate matter builds to a certain level on PTR 14, the PTR is cleaned. First, motor 20 is turned off. Actuator 16 is then actuated to move PTR 14 out of contact with moving web 12; clutch 22 continues its engagement. Since PTR 14 was driven by the moving web, PTR 14 slows down as it is spaced from moving web 12, whereby PTR 14 acts as an idler roller. Actuator 16 positions PTR 14 to abut cleaning web 26 and cleaning transport roller 30. Cleaning web 26 is transported across cleaning transport roller 30, and PTR 14 is driven by the moving cleaning web during which the particulate matter transfers from the PTR to the cleaning web. When renewal of the PTR is complete, actuator 16 spaces PTR 14 from cleaning web 26 and cleaning transport roller 30, whereby the operation cycle can be repeated.

Driving PTR 14 to pre-determined speed V which is not equal to or greater than sensed speed S provides advantages. Applicants have noted that over-driving the PTR does not provide for the decoupling of the PTR from motor 20. Abrasions or defects from the web could result from the PTR surface speed moving faster than the web surface speed. For photosensitive web material, the pre-determined speed V may be within 5% of sensed speed S or as close as 0.5%.

Plurality of Particle Transfer Rollers and Cleaning Stations

A plurality of PTRs 14 and cleaning stations 24 may be employed to continuously clean moving web 12 and PTRs 14 with minimal down-time. One or two sides of web 12 may be cleaned using the apparatus of the present invention. FIGS. 3 through 6 illustrate an apparatus for continuously cleaning two sides of web 12.

FIGS. 3 through 6 show a plurality of transport rollers 10 mounted for transporting web 12. Speed sensor 18 is shown as a speed sensing roller 34 having an encoder. Speed sensing roller 34 is disposed in the web path. A plurality of PTRs 14a,14b, 14c,14d are disposed along the web path, each having a corresponding cleaning station, 24a,24b,24c, 24d, respectively.

Figure 3:
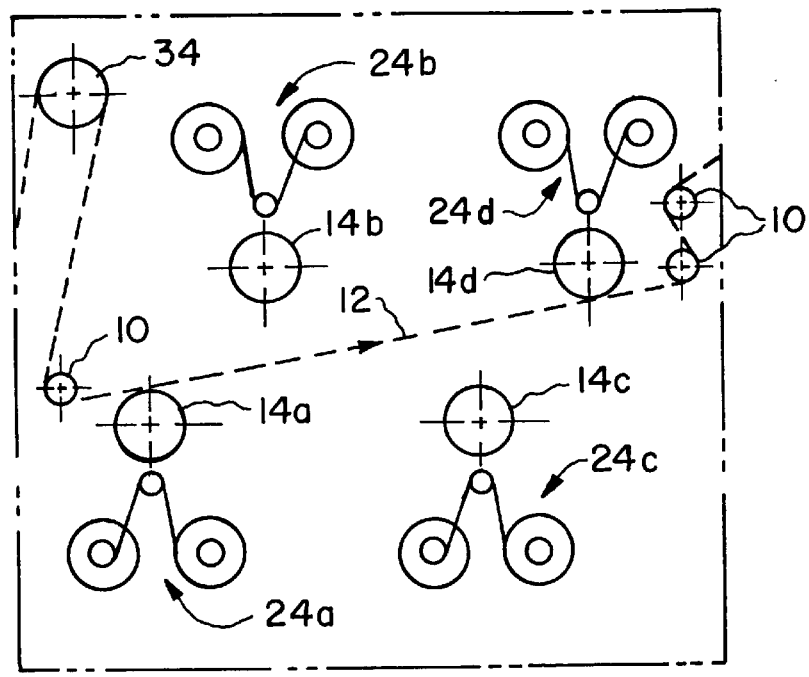
FIG. 3 shows a plurality of particle transfer rollers and cleaning stations arranged in a first mode.

FIG. 3 illustrates a first mode, wherein the PTRs and cleaning stations are spaced from web 12. Such a mode would be applicable if operation of the moving web is stopped. An operator would use this mode to thread web across the transport rollers.

Figure 4:
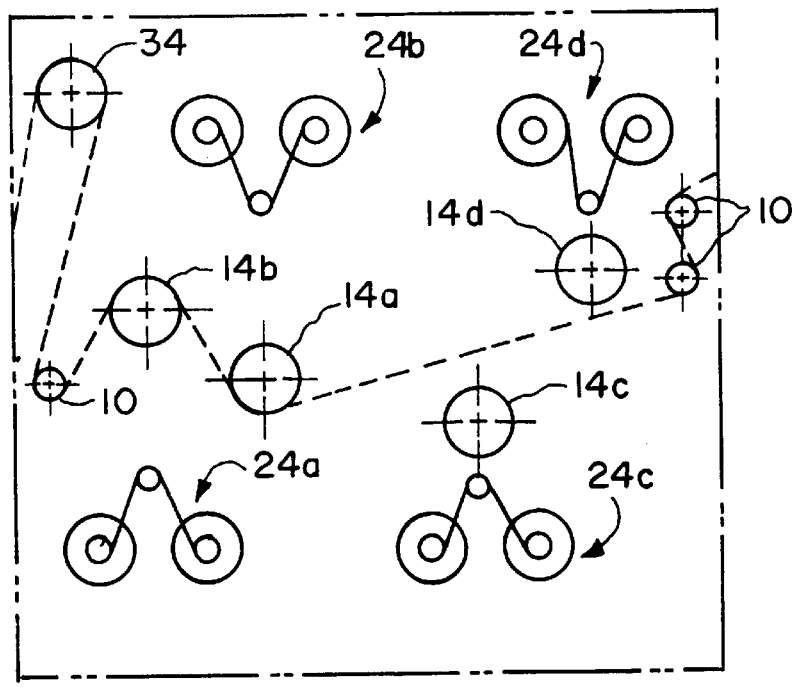
FIG. 4 shows a plurality of particle transfer rollers and cleaning stations arranged in a second mode wherein a first pair of particle transfer rollers is contacting the moving web and a second pair of particle transfer rollers is spaced from the moving web and the cleaning stations.
Figure 5:
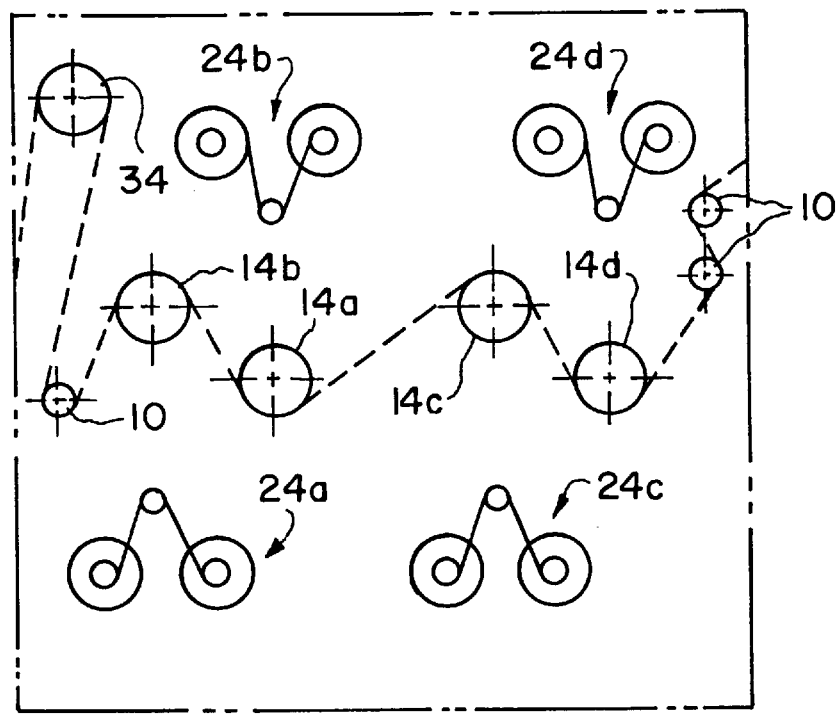
FIG. 5 shows a plurality of particle transfer rollers and cleaning stations arranged in a third mode wherein both the first and second pairs of particle transfer rollers are contacting the moving web.
Figure 6:
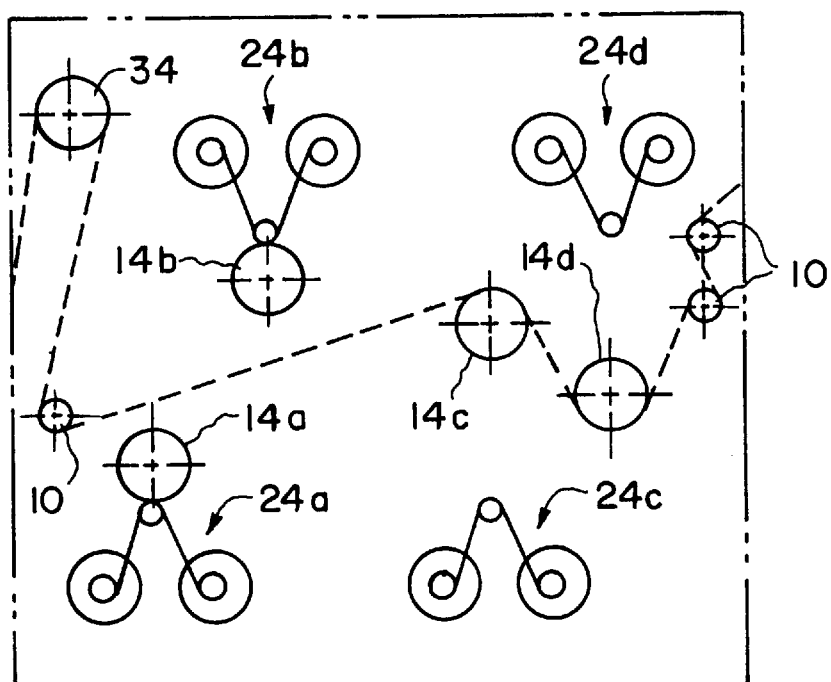
FIG. 6 shows a plurality of particle transfer rollers and cleaning stations arranged in a fourth mode wherein the second pair of particle transfer rollers is contacting the moving web and the first pair of particle transfer rollers is contacting the cleaning stations.

FIG. 4 illustrates a second mode wherein a first pair of PTRs 14a,14b contacts moving web 12 while a second pair of PTRs 14c,14d is in a stand-by position. That is, the second pair 14c,14d is spaced from both moving web 12 and cleaning stations 24c,24d. As the first pair of PTRs 14a,14b cleans moving web 12 and the level of particulate matter builds to a certain level, the second pair of PTRs 14c,14d are driven to speed V, approaching but not greater than sensed speed S, and engage moving web 12. Accordingly, as illustrated in FIG. 5, both the first and second pair of PTRs are in contact with, and are being driven by, moving web 12. With the second pair of PTRs cleaning moving web 12, the first pair of PTRs can be disengaged and renewed. This mode is illustrated in FIG. 6 wherein PTRs 14a,14b are in contact with their corresponding cleaning stations 24a,24b.

The PTRs can alternate in this manner between web-cleaning and PTR-renewal, to provide continuous cleaning of a web with minimal down-time for servicing. Further pluralities of such PTRs and cleaning stations, or pairs thereof, can be provided as necessary or desired for various web cleaning applications.

The apparatus is useful in any application requiring cleaning of a web. It is particularly useful in photographic film cleaning applications since scratches and abrasions are not introduced into the web.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An apparatus for cleaning a moving web, comprising:
    a web speed sensor sensing the speed of the moving web;
    a particle transfer roller rotatable about an axis and movable from (i) a first position wherein the particle transfer roller cleans the moving web through contact with the moving web to (ii) a second position wherein the particle transfer roller is spaced from the moving web;
    a driver driving the particle transfer roller to a pre-determined speed approaching but not equal to or greater than the sensed speed of the moving web when the particle transfer roller is in the second position;
    an actuator moving the driven particle transfer roller into contact with the moving web; and
    a mechanism associated with the particle transfer roller allowing the particle transfer roller to be driven by the moving web at a speed greater than the pre-determined speed when the particle transfer roller is in the first position.

2. The apparatus according to claim 1, further comprising a first cleaning station for cleaning the particle transfer roller when the particle transfer roller is in the second position.

3. The apparatus according to claim 1, wherein the mechanism is a passive one-way clutch.

4. An apparatus for cleaning a moving web having a first side and a second side, comprising:
    a web speed sensor sensing the speed of the moving web;
    a first particle transfer roller rotatable about a first axis and disposed on the first side of the web, said first particle transfer roller being movable from (i) a first position wherein the first particle transfer roller cleans the first side of the moving web through contact with the moving web to (ii) a second position wherein the first particle transfer roller is spaced from the moving web;
    a second particle transfer roller rotatable about a second axis and disposed on the second side of the web, said second particle transfer roller movable from (i) a third position wherein the second particle transfer roller cleans the second side of the moving web through contact with the moving web to (ii) a fourth position wherein the second particle transfer roller is spaced from the moving web, the second axis being substantially parallel to the first axis;
    a driver driving the first and second particle transfer rollers to a pre-determined speed approaching but not equal to or greater than the sensed speed of the moving web;
    an actuator moving the driven first and second particle transfer rollers into contact with the moving web; and
    a first and second mechanism associated with the first and second particle transfer rollers, respectively, allowing the first and second particle transfer rollers to be driven by the moving web at a speed greater than the pre-determined speed when the first and second particle transfer rollers are in the first and third position, respectively.

5. The apparatus according to claim 4, further comprising a first cleaning station for cleaning the first particle transfer roller when the first particle transfer roller is in the second position and a second cleaning station for cleaning the second particle transfer roller when the second particle transfer roller is in the fourth position.

6. The apparatus according to claim 4, further comprising a controller controlling the actuator to alternately move the first and second particle transfer rollers in the first and third positions, respectively.

7. The apparatus according to claim 4, wherein the first and second mechanism is a passive one-way clutch.

8. An apparatus for cleaning a moving web, comprising:
  (a) a web speed sensor sensing the speed of the moving web;
  (b) a first station, the first station including:
    (i) a first plurality of particle transfer rollers rotatable about a first axis and movable from a first position wherein the first plurality of particle transfer rollers clean the moving web through contact with the moving web to a second position wherein the first plurality of particle transfer rollers is spaced from the moving web,
    (ii) a first plurality of cleaning stations for cleaning the first plurality of particle transfer rollers when the first plurality of particle transfer rollers is in the second position,
    (iii) a plurality of drivers driving each of the first plurality of particle transfer rollers to a pre-determined speed approaching but not greater than the sensed speed of the moving web,
    (iv) a first actuator moving the driven first plurality of particle transfer rollers into the first position, and
    (v) a one-way passive clutch coupled with each of the first plurality of particle transfer rollers allowing each of the first plurality of particle transfer rollers to be driven by the moving web at a speed greater than the pre-determined speed when the first plurality of particle transfer rollers is in the first position;
  (c) a second station disposed downstream of the first station, the second station including:
    (i) a second plurality of particle transfer rollers rotatable about a second axis and movable from a third position wherein the second plurality of particle transfer rollers cleans the moving web through contact with the moving web to a fourth position wherein the second plurality of particle transfer rollers is spaced from the moving web,
    (ii) a second plurality of cleaning stations for cleaning the second plurality of particle transfer rollers when the second plurality of particle transfer rollers is in the fourth position, the second axis being substantially parallel to the first axis,
    (iii) a plurality of drivers driving each of the second plurality of particle transfer rollers to a pre-determined speed approaching but not greater than the sensed speed of the moving web,
    (iv) a second actuator moving the driven second plurality of particle transfer rollers into the third position, and
    (v) a one-way passive clutch coupled with each of the second plurality of particle transfer rollers allowing each of the second plurality of particle transfer rollers to be driven by the moving web at a speed greater than the pre-determined speed when the second plurality of particle transfer rollers is in the third position; and
  (d) a controller controlling the first and second acutators to alternately move the first and second plurality of particle transfer rollers in the first and third positions, respectively.

9. The apparatus according to claim 8, wherein the moving web has a first side and a second side, one of the first plurality of particle transfer rollers being disposed on the one side of the moving web and another of the first plurality of particle transfer rollers being disposed on the second side of the moving web; one of the second plurality of particle transfer rollers being disposed on the one side of the moving web and another of the second plurality of particle transfer rollers being disposed on the second side of the moving web.

* * * * *